No. 766,700. PATENTED AUG. 2, 1904.
H. H. KENNEDY.
MOTH EXTERMINATOR.
APPLICATION FILED SEPT. 30, 1903.
NO MODEL.
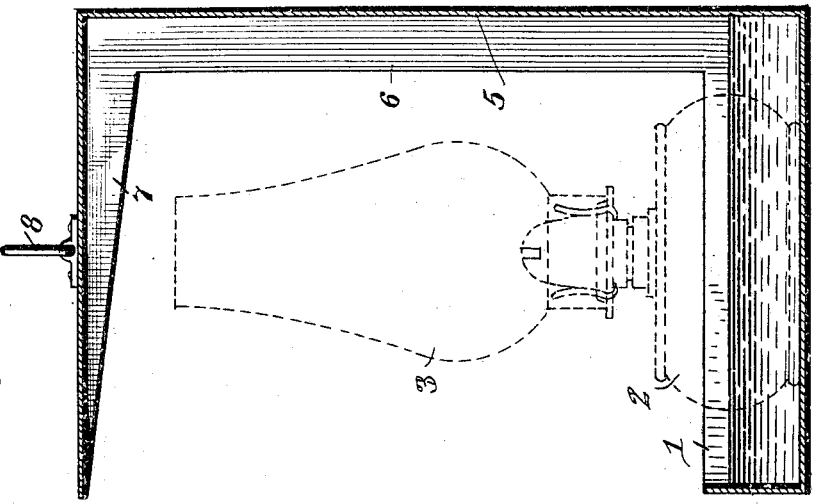
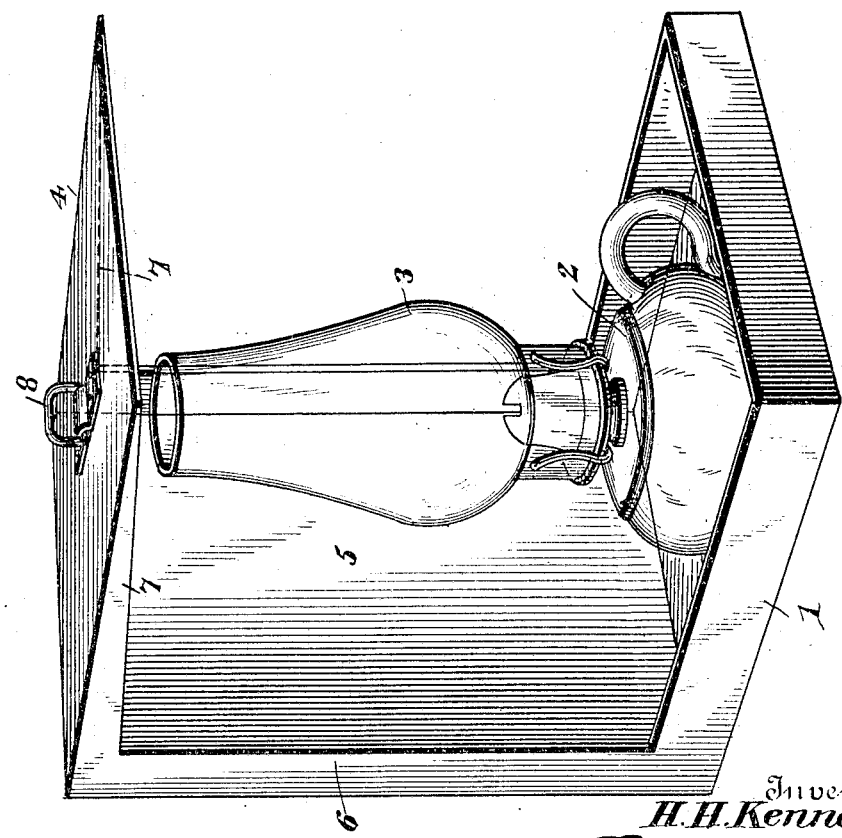
Witnesses
Jas. F. McCathran
N. J. Riley.
Inventor
H. H. Kennedy,
By
C. G. Siggers
Attorney No. 766,700. Patented August 2, 1904.

UNITED STATES PATENT OFFICE.

HENRY HARRISON KENNEDY, OF GOODYEARS BAR, CALIFORNIA.

MOTH-EXTERMINATOR.

SPECIFICATION forming part of Letters Patent No. 766,700, dated August 2, 1904.

Application filed September 30, 1903. Serial No. 175,190. (No model.)

*To all whom it may concern:*

Be it known that I, HENRY HARRISON KENNEDY, a citizen of the United States, residing at Goodyears Bar, in the county of Sierra and State of California, have invented a new and useful Moth-Exterminator, of which the following is a specification.

The invention relates to improvements in insect-destroyers.

The object of the present invention is to improve the construction of insect-destroyers and to provide a simple, inexpensive, and efficient one designed especially for exterminating apple and peach moths and other insects injurious to fruit and adapted to be hung out in an orchard or other convenient place and capable of attracting moths and other insects and of deflecting the same into a reservoir or receptacle, whereby such moths and other insects will be destroyed.

A further object of the invention is to provide a device of this character of great strength and durability adapted to be readily carried and capable of being conveniently suspended from a bough or other support.

The invention also has for its object to provide a moth-exterminator adapted to receive and support an ordinary lamp and adapted to protect the same from rain to cause the lamp to burn with a steady bright flame and to prevent the reflector from being clouded by smoke.

With these and other objects in view the invention consists in the construction and novel combination and arrangement of parts hereinafter fully described, illustrated in the accompanying drawings, and pointed out in the claim hereto appended, it being understood that various changes in the form, proportion, size, and minor details of construction within the scope of the claim may be resorted to without departing from the spirit or sacrificing any of the advantages of the invention.

In the drawings, Figure 1 is a perspective view of a moth-exterminator constructed in accordance with this invention. Fig. 2 is a vertical sectional view of the same.

Like numerals of reference designate corresponding parts in both figures of the drawings.

1 designates a shallow reservoir or receptacle designed to be constructed of sheet metal or other suitable material and adapted to contain water for drowning moths and other insects and forming a support for a lamp 2, which is adapted to attract the insects. The shallow receptacle or reservoir 1 consists of a horizontal bottom and side and vertical walls rising from the bottom, and the lamp, which may be of any desired construction, is provided with a chimney 3, over which is arranged an approximately horizontal top 4, which is adapted to protect the lamp from rain and which is supported by a combined reflector and back 5. The back 5, which rises from the rear wall of the reservoir and which forms a continuation of the same, is provided with a polished or bright inner face or surface, and it is adapted to throw the light and operate as a reflector. The back is provided at opposite sides with upright flanges or extensions 6, which are adapted to strengthen and support the reflector.

The top of the moth-exterminator is provided with tapering side flanges 7, which depend from the side edges of the top and which form extensions of the side flanges 6. These tapering top flanges strengthen and stiffen the top of the device, which is provided with a loop 8 for enabling the device to be readily carried in the hand and also to permit it to be conveniently suspended from a bough or limb. The loop is adapted to receive a cord, hook, or any other attaching means, and in practice it will be secured to a tree in convenient position for attracting moths and other insects injurious to fruit. The moths and other insects attracted by the light of the lamp will fly against the back and will be caused by the same to fall into the bottom receptacle or reservoir, which is designed to contain water or any other suitable liquid for drowning or otherwise destroying such insects.

The device is adapted to be easily and cheaply manufactured and may be conveniently cut out of an oil-can or similar receptacle after the same has been used, and it has been found by experience that it will effectively destroy night-flying moths and other insects and exterminate the same before the insects have an opportunity to injure fruit-trees. The upright and horizontal flanges of the back and top of the device serve to strengthen the reflector and top, and they also enable the device to be conveniently carried without liability of weakening or otherwise injuring it.

The device may also be suspended by the handle, and the top operates as a shield and is adapted to protect the lamp from rain. The back operates as a reflector, and is also adapted to throw the moths in the water. The lamp is effectively protected by the device and is adapted to burn with a bright light without smoking, so that there is no liability of tarnishing and thereby injuring the reflector.

Having thus fully described my invention, what I claim as new, and desire to secure by Letters Patent, is—

In a device of the class described, the combination of a bottom reservoir or receptacle designed to contain a liquid and having a horizontal bottom adapted to receive and support a lamp, a back constituting a reflector and extending upwardly from the rear wall of the reservoir and forming a continuation of the same, said back being provided with upright side flanges forming continuations of the side walls of the reservoir or receptacle, a horizontal top extending forwardly from the back to the front of the device and provided with depending side flanges extending outwardly from the side flanges of the back and forming continuations thereof, and a loop secured to the upper face of the top and forming a handle and adapted to enable the device to be readily suspended from a limb of a tree, substantially as described.

In testimony that I claim the foregoing as my own I have hereto affixed my signature in the presence of two witnesses.

HENRY HARRISON KENNEDY.

Witnesses:
ESTELLE T. SOWARD,
W. I. REDDING.